US009183532B2

(12) United States Patent
Hauser et al.

(10) Patent No.: US 9,183,532 B2
(45) Date of Patent: Nov. 10, 2015

(54) METHOD AND DEVICE FOR DETECTING AND DETERMINING THE PRESENCE OF OBJECTS IN STORAGE LOCATIONS BY MEANS OF A BAR CODE READING DEVICE

(71) Applicant: BDT Media Automation GmbH, Rottweil (DE)

(72) Inventors: Stefan Hauser, Oberndorf am Neckar (DE); Norbert Reismann, Villingen-Schwenningen (DE)

(73) Assignee: BDT MEDIA AUTOMATION GMBH, Rottweil (DE)

( * ) Notice: Subject to any disclaimer, the term of this patent is extended or adjusted under 35 U.S.C. 154(b) by 0 days.

(21) Appl. No.: 14/285,646

(22) Filed: May 23, 2014

(65) Prior Publication Data

US 2014/0353376 A1 Dec. 4, 2014

(30) Foreign Application Priority Data

May 29, 2013 (EP) .................................... 13169735

(51) Int. Cl.
*G06F 19/00* (2011.01)
*G06K 15/00* (2006.01)
*G06K 7/10* (2006.01)
*G06Q 10/08* (2012.01)

(52) U.S. Cl.
CPC .............. *G06Q 10/087* (2013.01); *G06Q 10/08* (2013.01)

(58) Field of Classification Search
CPC ....... G11B 27/002; G06K 7/14; G06K 7/1404
USPC ................. 235/383, 385, 454, 462.01–462.49
See application file for complete search history.

(56) References Cited

U.S. PATENT DOCUMENTS

| 5,450,385 | A | 9/1995 | Ellis et al. |
| 5,637,854 | A | 6/1997 | Thomas |
| 5,814,171 | A | 9/1998 | Manes et al. |
| 6,246,642 | B1 | 6/2001 | Gardner, Jr. et al. |
| 7,184,242 | B1 | 2/2007 | Ostwald |
| 8,141,821 | B1 | 3/2012 | Pancotti et al. |
| 2005/0067490 | A1* | 3/2005 | Fletcher ........................ 235/383 |
| 2006/0180670 | A1* | 8/2006 | Acosta et al. ............ 235/462.31 |
| 2007/0159715 | A1 | 7/2007 | Steinhilber |
| 2010/0252633 | A1 | 10/2010 | Barkan et al. |
| 2012/0181338 | A1* | 7/2012 | Gao .............................. 235/455 |

FOREIGN PATENT DOCUMENTS

| DE | 60029668 T2 | 4/2007 |
| DE | 102005054560 B3 | 5/2007 |
| DE | 102005057673 A1 | 6/2007 |
| EP | 2414988 A1 | 2/2012 |

* cited by examiner

*Primary Examiner* — Laura Gudorf
(74) *Attorney, Agent, or Firm* — Leydig, Voit & Mayer, Ltd.

(57) ABSTRACT

A method for detecting and determining a presence of at least one object in at least one storage location without a special reflection surface includes providing a bar code reading device which is connected to a control unit configured to manage an allocation of the at least one object to the at least one storage location. The bar code reader is used in an attempt to detect a bar code in the at least one storage location. Using information from which a grey value is derivable, it is determined whether the at least one object is in the at least one storage location upon the bar code reader being unsuccessful in detecting the bar code. A result is provided to the control unit.

18 Claims, 6 Drawing Sheets

| Object | Average grey value |
|---|---|
| Yellow LTO cassette | 122.6 |
| Black LTO cassette | 20.4 |
| Empty storage location | 7.8 |

Fig. 11

| Object | Average grey value | Average grey value / exposure time | Exposure time [ms] |
|---|---|---|---|
| Yellow LTO cassette | 43.8 | 62.6 | 0.7 |
| Black LTO cassette | 25.0 | 11.9 | 2.1 |
| Empty storage location | 27.3 | 2 | 13.5 |

Fig. 12

METHOD AND DEVICE FOR DETECTING AND DETERMINING THE PRESENCE OF OBJECTS IN STORAGE LOCATIONS BY MEANS OF A BAR CODE READING DEVICE

CROSS-REFERENCE TO PRIOR APPLICATION

Priority is claimed to European Patent Application No. EP 13169735.1, filed on May 29, 2013, the entire disclosure of which is hereby incorporated by reference herein.

FIELD

The invention relates to a method and a device for detecting and determining the presence of objects in storage locations by means of a bar code reading device.

BACKGROUND

In the context of automatic stock-keeping and stock management of objects, bar codes are often used for identifying the objects, since they are cost-effective to print and can be applied using printed labels. A major component of automatic systems for stock-keeping and stock management of objects is taking inventory after power-up, after manual interventions and in the context of special handling etc. For this purpose, in the above-mentioned systems, all storage locations required for taking inventory are automatically approached, for example using a robot which comprises a bar code reading device, and it is subsequently attempted to read the respective bar code of an object. Initially, it needs to be distinguished whether or not there is an object at the corresponding storage location. If there is an object of which the bar code can be identified, the corresponding object is linked, by way of the bar code thereof, to the corresponding storage location in the stock management system. Often, the stock management system is a control unit of the robot or is connected to said unit. Generally, it is a memory area in which the detected bar codes are stored in connection with a storage location. There are basically the following possible situations:
a) the object in the storage location is provided with a bar code which can be identified, and subsequently this bar code is stored in the stock management system;
b) there is an object in the storage location without a bar code, or the bar code cannot be detected, for example because it is incompatible or damaged etc.; and
c) there is no object in the storage location.

If at the corresponding storage location there is an object of which the bar code cannot be detected or which does not have a bar code, the aim is to detect whether the corresponding storage location is occupied by an unknown object.

If there is no object at the corresponding storage location, this storage location should be linked as a free storage location in the management system. Since the storage is often dark and the objects are uniform articles, an illumination unit of the bar code reading device is required. This is often provided with a laser light or an IR or LED light source to illuminate the objects. Bar code reading devices based on photosensitive media, such as CCD-based or CMOS-based cameras or line scan cameras, are constructed in a correspondingly simple manner for detecting bar codes. There is no image recognition in the conventional sense. For reasons of cost, a unit should be used which is basically only targeted at detecting bar codes. Because of the very high packing density in a storage location, in some applications the free storage locations match the uniform objects virtually exactly. Also, the objects are provided in the same physical format, although the colours thereof may vary. A specific field of use are memory robots or tape robots which have one or more memory drives in which the storage media are to be transported, and when they have been written with data, the tapes have to be transported back to the storage location thereof again. Memory robots of this type are disclosed in greater detail in DE 10 2005 057 673, in DE 10 2005 054 560 B3, and in U.S. Pat. No. 7,184,242 B1, for example.

U.S. Pat. No. 5,450,385 A discloses a system which provides storage locations or information memory elements with machine-readable markings, for example a special bar code, which is located at a position inside the storage location which would be covered by an object if the storage location were occupied by an object.

U.S. Pat. No. 5,814,171 A likewise discloses a system which provides storage locations/receiving devices for storage with optically readable markings or imprints in the receiving device, which can only be read if the receiving device is empty, since they would be covered by a stored object.

DE 600 29 668 T2 discloses a method and a device, by way of which it can be determined using an optical detection system whether there are objects at predetermined positions. For this purpose, the storage locations which represent the positions are provided on the rear faces thereof with reference surfaces, which produce a contrast with the rest of the surface of the rear wall of a receiving device in terms of light reflection.

Drawbacks of the aforementioned systems and methods recognized in an embodiment of the present invention are that they:
i) absolutely require reflection even for empty storage locations, meaning that they are unsuitable for open shelf systems for example, since these reflections are provided by markings on the rear wall of the storage location or by the rear wall itself.
ii) require more complex method steps in the production of the systems, since corresponding empty marks have to be applied to the rear walls of the systems.

U.S. Pat. No. 5,637,854 A discloses a device and a method for reading bar codes on test tubes. The presence of elements is detected on the basis of evaluating the spectrum of the reflected light. This system is provided for use in open systems without a rear wall, but is based on coherent light sources such as lasers. However, for automated use, laser-based bar code reading devices have the drawback that they cannot read omnidirectionally. This would accordingly make it necessary always to have bar codes applied in the correct orientation, or to track the bar code reading device in a plurality of directions. Further, bar code reading devices of this type do not have the option of interpreting multi-dimensional bar codes, and this is increasingly disadvantageous for many applications. The size of these devices can also only be miniaturised under some circumstances, and so laser-based bar code reading devices sometimes cannot meet the necessary requirements.

SUMMARY

In an embodiment, the present invention provides a method for detecting and determining a presence of at least one object in at least one storage location without a special reflection surface. A bar code reading device is provided which is connected to a control unit configured to manage an allocation of the at least one object to the at least one storage location. The bar code reader is used in an attempt to detect a bar code in the at least one storage location. Using information from which a grey value is derivable, it is determined whether the at least one object is in the at least one storage location upon the bar code reader being unsuccessful in detecting the bar code. A result is provided to the control unit.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. In the drawings, like reference numerals denote like or functionally equivalent parts, and for improved clarity not all reference numerals are specified in all drawings. The features and advantages of various embodiments of the present invention will become apparent by reading the following detailed description with reference to the attached drawings which illustrate the following.

DETAILED DESCRIPTION

In an embodiment, the invention provides for the detection and determination of the presence of objects in storage locations for automatic stock-keeping and stock management of objects by means of a bar code reading device which is suitable both for open and for closed shelf/support systems and which does not necessarily rely on coherent light. Particular attention is also to be paid to the manufacturing costs, so as to make use possible even in systems with large numbers of units; accordingly, the aim is, among other things, in an embodiment, to be able to use conventional commercial bar code reading devices, such as the CSE600 from SYMBOL or MOTOROLA, which is limited to the H/W/D dimensions (7.35/19.75/9.66) millimeters and is based on a line scan camera. The object is lit up using an LED classified under EN 60825-1.

Further the invention is not to be limited merely to one-dimensional bar codes. Accordingly, it would also be possible to carry out the method in connection with a camera-based bar code reading device, such as the SE3300 from MOTOROLA, which also has very small dimensions of H/W/D (17/30/17.3) millimeters. In this case, the lighting is provided by way of two LEDS classified under EN 60825-1.

Definitions

Bar codes should be understood as including the following machine-readable data sets, inter alia:

bar code, such as EAN, IAN, JAN, UPC, ITF, ISBN, ISSN etc.

multi-dimensional bar code, such as PDF417 matrix codes data matrix codes dot codes, for example QR codes

This list is non-exclusive. Further codes are conceivable.

Coherent light refers to electromagnetic radiation which has a fixed phase relationship in relation to temporal and spatial propagation. This means strongly beamed light of as uniform a wavelength as possible.

Electromagnetic radiation of any wavelength is referred to as light in this document.

In an embodiment, the present invention provides a method for detecting and determining the presence of objects in storage locations by means of a bar code reading device, comprising at least one bar code reading device which is guided automatically, for example by a robot, so as to be positioned at at least one storage location, at least one storage location for objects, preferably a superordinate control unit for evaluating the read results and for data management.

In a preferred embodiment, a bar code reading device having a fixed exposure time is used. The exposure time may be in the range of fractions of a microsecond up to several milliseconds, but typically the exposure time is between 30 microseconds and 20 milliseconds.

Alternatively, a particularly preferred embodiment comprises a bar code reading device having automatic exposure control. Bar code reading devices of this type automatically adjust the exposure time to the signal quality, with the aim of always adjusting the average grey value which is determined via the cells/elements/pixels of a photosensitive medium (preferably a plurality of these cells) to a particular level. Accordingly, an empty storage location is exposed for a very long time, since only very little light is reflected. By contrast, an object in a storage location reflects much more light, bringing about a higher grey value and thus a shorter exposure time.

A preferred embodiment of the invention further comprises drives, transmissions and guides, or a robot, so as to be able to position the bar code reading device in front of the storage locations.

The storage locations should be configured in a manner which reflects as little light as possible towards the photosensitive medium of the bar code reading device. This may be achieved for example by way of a storage location which is made of black plastics material and which is only open to one side, the side facing the bar code reading device or the robot, since in this case black body laws apply whereby electromagnetic radiation, thus including light, is largely converted into heat and thus emitted to the environment.

In a particularly preferred embodiment, in addition to the black material the storage location has a texture, such as MOLD-TECH 11006 with an average roughness depth $R_z$ of 0.25 millimeters and a maximum individual roughness depth $R_M$ of 3.05 millimeters, or a rough surface of the plastics material, which because of the density and depth of the structure is suitable for converting directed light into scattered light, and therefore less light arrives at the photosensitive medium for detecting the bar code. However, it is also conceivable to use a storage location which is based merely on a tray or rack, without a side wall and back wall, and which therefore has no reflective surfaces for the light emitted by the reading device. The object is merely positioned on the rack.

By means of the drives, transmission and guides, or the robot, the bar code reading device is positioned in front of a storage location and actuated via the superordinate control unit. There are three possible situations (hereinafter referred to herein as Situations a)-c)):

a) The storage location contains an object of which the bar code can be read and decoded.

b) There is an object in the storage location of which the bar code cannot be read or which does not have a bar code.

c) The storage location is empty.

In Situation a), the bar code reading device of the superordinate control unit would provide the decoded bar code. The control unit would subsequently produce a cross-reference between the selected storage location and the detected bar code, so as to be able to find the object represented by the bar code again in the system unambiguously at any moment.

In a preferred embodiment, a bar code reading device having a fixed exposure time is used. In devices of this type, a photosensitive medium, such as a CCD-based or CMOS-based camera or line scan camera, is exposed for a fixed time period. The exposure time may vary in a range from fractions of a microsecond to several milliseconds, but typically the exposure time is between 30 microseconds and 20 milliseconds. The grey value increases with the amount of light received by the photosensitive medium within this time. Since reading devices of this type generally have a plurality of cells/elements/pixels of a photosensitive medium, the average grey value over the corresponding cells/elements/pixels serves as a predictive measure. For the Situations b) and c), the bar code reading device of the superordinate control unit provides the average grey value, averaged over all of the pixels/cells. The average grey value is now in turn evaluated in the control unit. The grey value of an empty storage location in Situation c) differs significantly from the grey value resulting from Situation b), since in Situation b) much more light is reflected, and this is expressed by a higher grey value. Accordingly, the grey value may be used to reach conclusions about the presence of an object within a storage location.

In a particularly preferred embodiment, a bar code reading device having automatic exposure control, as disclosed for example in U.S. Pat. No. 8,141,821 B2 or EP 2,414,988 A1, is used. A bar code reading device of this type having automatic exposure control for a line scan camera is provided for example by the CSE600 from SYMBOL or MOTOROLA. Bar code reading devices of this type automatically adjust the exposure time to the signal quality, with the aim of always adjusting the average grey value to a particular level. Accordingly, an empty storage location would be exposed for a very long time, since only very little light is reflected. In Situation b), much more light would be reflected than in Situation c), leading to a higher grey value and thus a shorter exposure time. Moreover, this still applies even if there is a black object without a bar code in the storage location. Accordingly, much higher grey values and thus significantly shorter exposure times would be achieved for Situation b) than for Situation c). As a logical consequence, the bar code reading device having automatic exposure control has to pass on the exposure time for Situations b) and c) to the superordinate control unit. By evaluating the exposure time, this unit can then produce a cross-reference for case b) that the presently selected storage location contains an object which cannot be optically identified in greater detail, whilst Situation c) is provided as a free storage location. The bar code reading device provides the possibility of calling or querying the exposure time, or passes this on. This may take place via the same interface used for conveying the bar code information.

In an embodiment, the method out is carried out directly in the bar code reading device, which in this case passes on the corresponding message for an empty storage location in Situation c) or the presence of an object which cannot be identified in greater detail in Situation b) to the superordinate control unit, instead of the grey value or the exposure time.

An embodiment of the invention may be applied in systems for automatic stock-keeping and stock management of objects, as is the case for example in automatic medium exchange devices for managing, exchanging and replacing data carriers and automatically receiving and playing back data on data carriers.

A further field of application is picking machines, which are increasingly being used for example in pharmacies. In this case too, the aim is to read, store and issue objects and manage the stock automatically.

Further, it is also conceivable to apply the method in automatic self-service tills, since in this case either a sensor or part of the image processing could be dispensed with if it is merely used for detecting whether there are actually one or more objects present.

In automated print finishing machines, too, bar codes may be used so as to select a particular finishing process. In this context too, at least one sensor can be dispensed with if the bar code reading device or the superordinate control unit can distinguish whether it was merely not possible to identify a bar code or whether there is actually no object present.

Because of the need to consider cost-optimised processes in health care, more and more automated process are being used in this field. One example of this is the automation of laboratory processes/systems. In this field too, the proposed invention has major advantages, since multi-dimensional bar codes are increasingly being used in this context so as to make more data available in a small area and make it possible to encrypt data. In this case too, it is particularly beneficial to be certain whether a storage location is free or occupied if the bar code could not be read. This can be transferred to other laboratory automation systems which deal with laboratory processes in the field of pharmaceutical, biological, chemical and food technology, as well as automating laboratory processes for the medical field.

The above applications are merely examples, and there are naturally many more applications which make use of systems for automatic stock-keeping and stock management of objects and for which detecting and determining the presence of these objects is a fundamental requirement.

In a preferred embodiment, the storage locations are made of black plastics material, so as to reflect as little light as possible towards the photosensitive medium of the bar code reading device. Further, in this case black body laws apply whereby electromagnetic radiation, thus including light, is largely converted into heat and thus emitted to the environment.

In a particularly preferred embodiment, the black material has a texture, at least on the rear wall, which because of the density and depth of the structure is suitable for converting directed light into scattered light, so as to reflect as little light as possible towards the photosensitive medium for detecting the bar code.

A particularly advantageous embodiment of the invention therefore has a texture with an average roughness depth $R_Z$ of 0.25 millimeters and a maximum individual roughness depth $R_M$ of 3.05 millimeters, since this texture has a structure of which the density and depth scatter the light sufficiently well as regards the LEDs used for illuminating the media, and thus sufficient play is achieved to distinguish by means of grey value thresholds or exposure time thresholds.

In a preferred embodiment of the invention, the bar code reading device comprises a plurality of photosensitive elements and the grey value is averaged over the individual photosensitive elements, since the average grey value over a plurality of elements makes a prediction possible as to whether light was reflected in a targeted manner and how much. In connection with this, a prediction can be made as to whether or not there is an object in the storage location.

In a particularly preferred embodiment, the bar code reading device is a linear or multi-dimensional digital image data system, since in this way the use of coherent light sources such as lasers can be dispensed with, since laser-based bar code reading devices for automatic use have the drawback that they cannot read omnidirectionally. This would accordingly make it necessary always to have bar codes applied in the correct orientation, or to track the bar code reading device in a plurality of directions, and this in turn results in complicated mechanical constructions having an increased susceptibility to wear. Further, bar code reading devices of this type do not have the possibility of being able to interpret multi-dimensional bar codes, and this is increasingly disadvantageous for many applications. The size of these devices can also only be miniaturised under some circumstances, and so laser-based bar code reading devices sometimes cannot meet the necessary requirements. Thus, the CSE600 from Symbol or Motorola merely takes up dimensions of H/W/D (7.35/19.75/9.66) millimeters, and is based on a line scan camera. In this case, the object is lit up using an LED classified under EN 60825-1.

So as not to be limited merely to one-dimensional bar codes, the method proposed by an embodiment of the invention could also be carried out using a camera-based bar code reading device, such as the SE3300 from MOTOROLA, which also has very small dimensions of H/W/D (17/30/17.3) millimeters. In this case, the lighting is provided by way of two LEDs classified under EN 60825-1.

In a preferred embodiment, the bar code reading device operates using a fixed exposure time, and the information from which the grey value can be derived is the grey value itself, and if the grey value falls below a particular threshold, the storage location should be assumed to be empty. In devices of this type, a photosensitive medium, such as a CCD-based or CMOS-based camera or line scan camera, is exposed for a fixed time period. The exposure time may vary in a range from fractions of a microsecond to several milliseconds, but typically the exposure time is between 30 microseconds and 20 milliseconds. The grey value increases with the amount of light received by the photosensitive medium within this time. Since reading devices of this type generally have a plurality of cells/elements/pixels of a photosensitive medium, the average grey value over the corresponding cells/elements/pixels serves as a predictive measure. The grey value of an empty storage location differs significantly from the grey value of an object without a bar code. This is because in storage locations which are only open towards the side facing the bar code reading device or the robot, there is an attempt to convert incident light into scattered light, meaning that much lower average grey values are to be expected in this case. In open shelf support systems, which merely comprise at least one tray or rack, without a rear wall and/or side wall, and which therefore have no reflective surfaces for the light emitted by the reading device, obviously much more light is reflected from an object which is positioned on the rack, and this is expressed by a higher grey value. Accordingly, the grey value may be used to reach conclusions about the presence of an object within a storage location.

In a particularly preferred embodiment of the invention, the bar code reading device operates using an automatic exposure control and the information which can be derived from the grey value is the exposure time, and if the exposure time exceeds a particular threshold, it should be assumed that the storage location is empty. Bar code reading devices of this type automatically adjust the exposure time to the signal quality, with the aim of always adjusting the average grey value to a particular level. Accordingly, an empty storage location would be exposed for a very long time, since only very little light is reflected, and this in turn leads to a low grey value per unit time and thus to a long exposure time.

In a preferred embodiment, the bar code reading device passes on the exposure time or the grey value to a superordinate control unit via an interface, and the superordinate control unit checks the threshold. Since there is the possibility that the control unit which detects the bar code is the same one which takes on the stock management, in this case the interface would merely be an SW interface, and in this regard the term "superordinate control unit" would refer to the architecture of the SW and not to physically separate control units. If there are a plurality of physical control units, the interface which is used for exchanging the exposure time or the grey value could be one or more of the following: shared memory, serial interface, RS232, RS485, smart serial interface (SSI), CAN, CANopen, Ethernet, WLAN, NFC, IIC, IR etc.

In a particularly preferred embodiment, both information about the detected bar code and the exposure time or grey value are conveyed via the same interface, in such a way that merely a protocol extension is required, and not an additional interface.

In one possible embodiment, the bar code reading device is mounted on a transport unit. This makes it possible, in stock management systems comprising more than one storage location, to position the bar code reading device in an automated manner at the respective storage location, so as for example to take inventory.

In one possible embodiment, the transport unit is a robot. An example of a robot which carries along a bar code reading device is disclosed in DE 10 2005 054 560.

In a particularly preferred embodiment, the method is part of a system for automatic stock-keeping and stock management of objects.

Possible embodiments of a system for automatic stock-keeping and stock management of objects include, inter alia, the following systems:
  automatic medium exchange device, such as tape memory library systems, replacement systems for optical media, hard disk replacement systems etc.
  a picking machine or picking system; this may apply to automated devices for placing in and removal from storage and for stock management of objects, as found for example in pharmacies, mail order centres etc.
  a self-service till
  a printing press or print finishing machine a laboratory automation system; this applies inter alia to the automation of laboratory processes in the fields of medical, pharmaceutical, biological, chemical and food technology.

A particularly preferred embodiment of the invention has a bar code reading device for detecting objects in at least one storage location, which has no special reflection surface. The bar code reading device is connected to a control unit which manages the allocation of objects to the storage location. Further, the bar code reading device and the control unit can exchange further data, such as the detected average grey value or the exposure time. The system consisting of the bar code reading device and the control unit thus makes it possible to determine the presence of an object in a storage position if it was not possible to detect a bar code, since an object which is located in a storage location reflects much more light, this being expressed by a higher grey value, than an empty storage location. Bar code reading devices having automatic exposure control automatically adjust the exposure time to the signal quality, with the aim of always adjusting the average grey value to a particular level. Accordingly, an empty storage location would be exposed for a very long time, since only very little light is reflected, and this in turn leads to a low grey value per unit time and thus to a long exposure time. The aim of stock-keeping systems and stock management systems is to be able to manage storage locations correctly, in other words to be able to make a prediction as to whether there is an object in a storage location, irrespective of whether it was possible to detect a bar code. Therefore, in an advantageous embodiment of the invention, the following steps are preferably carried out:

attempting to detect a bar code,
if the detection was not successful, attempting to detect whether there is an object in the storage location, using information from which a grey value can be derived,
providing the result to the control unit.

A further embodiment of the invention provides a device which is formed appropriately so as to carry out the aforementioned method.

An embodiment of the invention has advantages in particular in cases where reflection surfaces cannot be applied, or only at great expense, on the side opposite the bar code reading device, or would make the manufacture unnecessarily expensive. Further, the method has saving potential, since by way of an embodiment of the proposed method at least a further sensor for determining the presence of an object or image data processing for the same purpose becomes superfluous.

Figure 1:
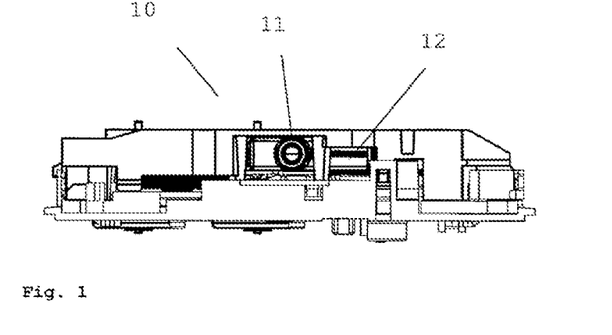
FIG. 1: bar code reading device.

FIG. 1 shows a bar code reading device 10 which comprises a receiving unit for detecting the bar code 11 and preferably a separate illumination unit 12. In a preferred embodiment, the receiving unit for detecting the bar code 11 is represented by a digital image data system and the illumination unit 12 by an LED. Usually, bar code reading devices 10 of this type already contain a unit for evaluating the received signals and a communications interface for passing on the evaluated signals, and this is implemented by a microcontroller. It is therefore also perfectly possible to implement the proposed method within this microcontroller, and to define direct signals which unambiguously represent the Situations b) and c), instead of a grey value or an exposure time.

A further possibility would be to make use of a digital image data system without a decoding unit, and to carry out the decoding directly on a superordinate controller. By contrast with much larger laser-based scanner systems, a solution of this type can be implemented on a digital image data system having for example dimensions of H/W/D (8/38/12) millimeters.

Figure 2:
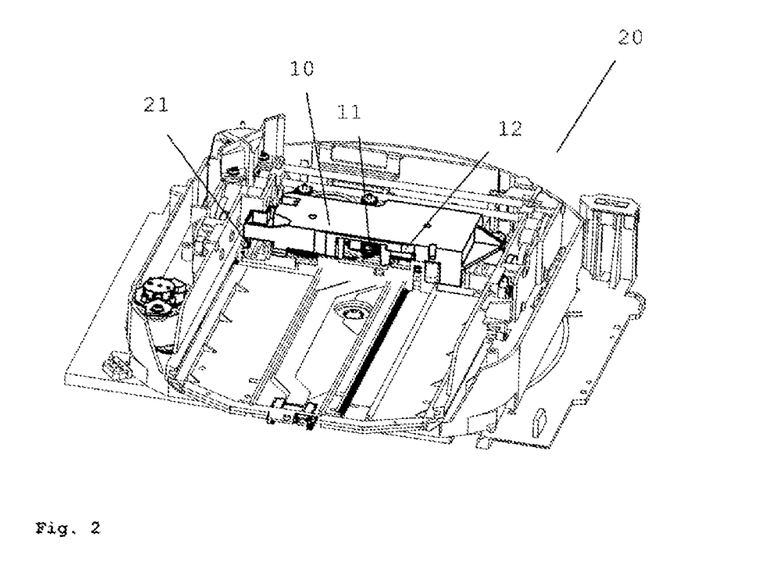
FIG. 2: gripper system comprising bar code reading device.

A gripper system 20 having a bar code reading device 10, as proposed for example in FIG. 2, is usually used in stock-keeping and stock management systems for placing objects in storage or removing them from storage in stock-keeping systems and stock management systems. For this purpose, an object is pulled onto the gripper system 20 from a handover location by means of the gripper tongs 21, until it is conveyed in front of an appropriate target, so as subsequently in turn to be handed over from the gripper system to the target, for example a storage location, by means of the gripper tongs 21.

Figure 3:
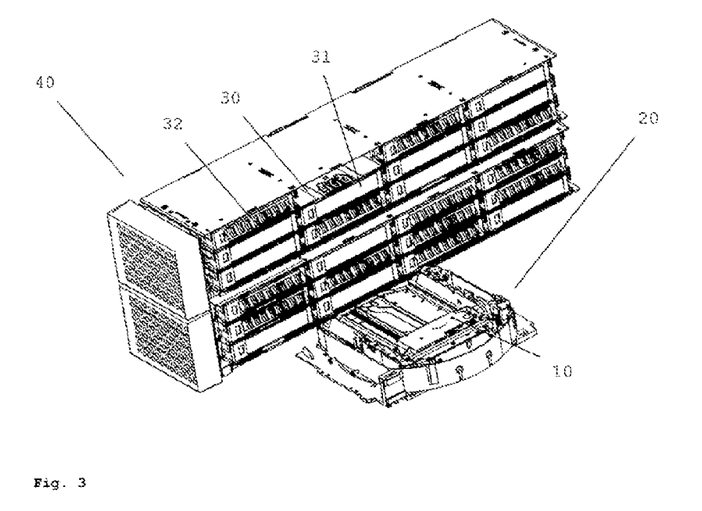
FIG. 3: detail of a device for automatic stock-keeping and stock management of data carriers, a gripper system having a bar code reading device.

FIG. 3 is a detail of a device for automatic stock-keeping and stock management of data carriers, and thus shows one possible example of the use of a gripper system 20 from FIG. 2. Devices for automatic stock-keeping and stock management of data carriers are generally used for backup copies and for archiving data inventories. The aim is to store data which are rarely needed on more favourable media, such as magnetic tapes, or to store backup copies, so as to be able to deal appropriately with emergency situations. For this purpose, a plurality of data carriers are managed inside a device for the automatic stock-keeping and stock management of data carriers, and, if it is desired to access them, are conveyed from a storage location of a warehouse 40 into a drive by means of the gripper system 20 in such a way that data can subsequently be read/written from or to the data carrier. When the read or write process is complete, the data carrier can be conveyed back into an empty storage location 30 in the warehouse 40 and kept safe. So as to provide an unambiguous allocation as to where each data carrier is located, and thus be able to reproduce the data, the data carriers are generally provided with bar codes. Thus, for example in the server, an allocation of a bar code to particular data sets can be created.

Therefore, after power-up, after manual interventions and in the context of special handling etc., an inventory needs to be taken. For this purpose, all storage locations required for taking inventory are approached, using the gripper system 20, and it is subsequently attempted to read the respective bar code of a data carrier using the bar code reading device 10. Since in a warehouse 40, as shown in FIG. 3, there are empty storage locations 30, storage locations 30 comprising objects without a bar code 31 and storage locations 30 comprising objects 32 distinguished by a bar code, the aim is initially to distinguish whether there is actually an object in the corresponding storage location 30. Accordingly, in the first step the respective storage location 30 is illuminated and an image or an image detail is subsequently created using the reflected light. On this basis, the bar code reading device 10 subsequently attempts to detect a bar code.

In a preferred embodiment, the storage locations 30 are made of black plastics material and only open to one side, towards the gripper system 20, since in this case black body laws apply whereby electromagnetic radiation, thus including light, is converted at least in part into heat and thus emitted to the environment.

In a particularly preferred embodiment, in addition to the black material the storage location has a texture, such as MOLD-TECH 11006 with an average roughness depth $R_Z$ of 0.25 millimeters and a maximum individual roughness depth $R_M$ of 3.05 millimeters, or a rough surface of the plastics material, which because of the density and depth of the structure is suitable for converting directed light into scattered light, and therefore less light is reflected.

Figure 4:
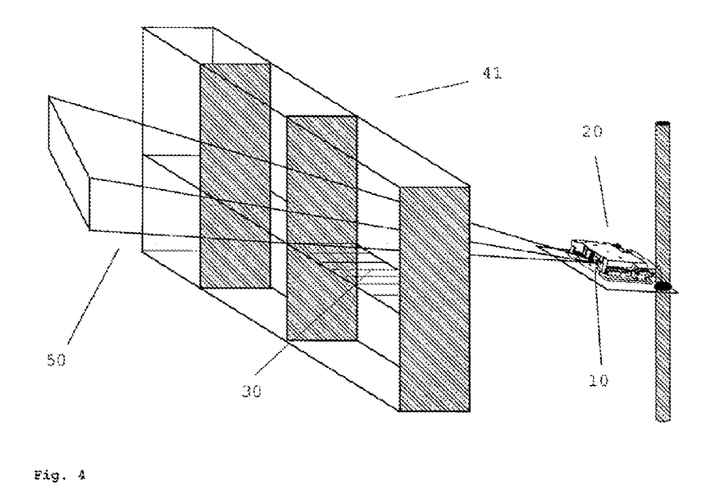
FIG. 4: schematic drawing of a device for automatic stock-keeping and stock management having an open shelf/support system, a gripper system having a bar code reading device.

FIG. 4 is a schematic drawing of a device for automatic stock-keeping and stock management using an open shelf/ support system 41, and in this case storage locations 30 may be represented by simple racks of a shelf and explicitly not have a rear wall. If a gripper system 20 is now positioned in front of an empty storage location 30 and the bar code reading device attempts to read a bar code, the target is illuminated and subsequently the bar code can be determined on the basis of the reflected light using suitable algorithms.

In the case of an empty storage location, because of the absence of the rear wall, this leads to a non-reflected light lobe 50, and this in turn has a direct influence on the grey value or the exposure time of the bar code reading device.

Figure 5:
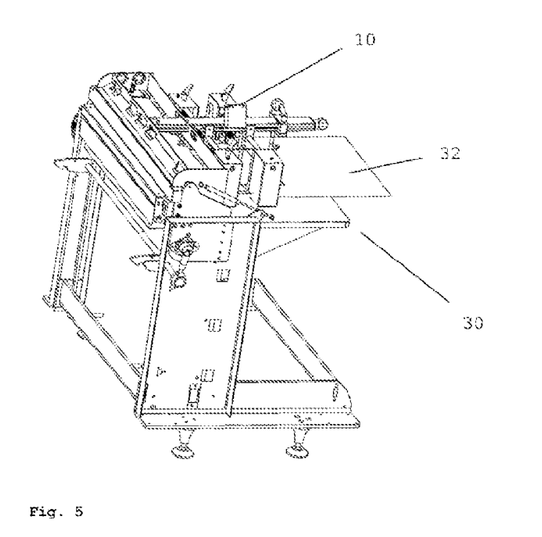
FIG. 5: sheet feeder of an automated print finishing system.

In print finishing, it is possible to provide each printed object at least with a bar code. It is thus possible to have each object 32 assigned to different post-production by way of the bar code. FIG. 5 shows by way of example a sheet feeder for the print finish. For this purpose, when the objects 32 are separated out the respective bar code can be read and the object 32 can be fed accordingly to the appropriate post-production steps. If, at the point opposite the bar code reading device in the storage location, there is a clearance, a black, textured surface or a surface which prevents light being reflected to the receiving part of the bar code reading device, it can be established by the proposed method, without the need for further sensors, on the basis of a non-reflected light lobe 50, on the basis of scattered light, or on the basis of reflected light, whether there are no further objects available in the storage location 30, or whether an object without a bar code 31 has been inserted, and this influences the following sequences in the process or the user instruction in the case of error.

Figure 6:
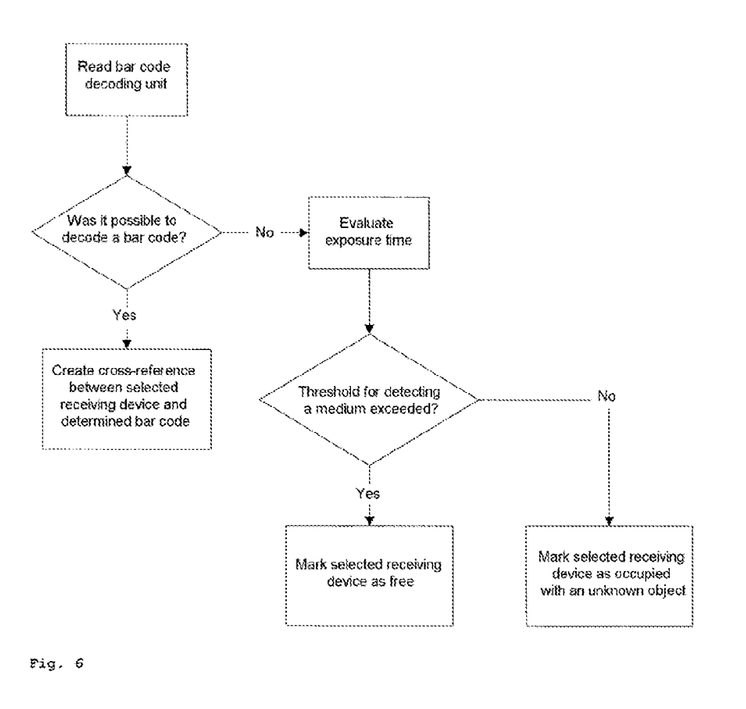
FIG. 6: flow chart for when a bar code reading device having automatic exposure control is used.

The proposed method for bar code reading devices 10 having automatic exposure control is described in greater detail by way of the flow chart in FIG. 6. In this context, the bar code reading device 10 would be positioned in front of a storage location 30. Subsequently, the bar code reading device would illuminate the target by means of the illumination unit 12, so as to attempt to decode a possible bar code by way of the reflected light. Systems having an automatic exposure time would adjust the exposure time so as to optimise the contrast. If no bar code can be detected, the proposed method offers the possibility of evaluating the exposure time, so as subsequently to decide, by way of a threshold, whether it was possible to identify an object without a bar code in the storage location, or whether said location is empty. This detection is of decisive importance for automated devices.

Figure 7:
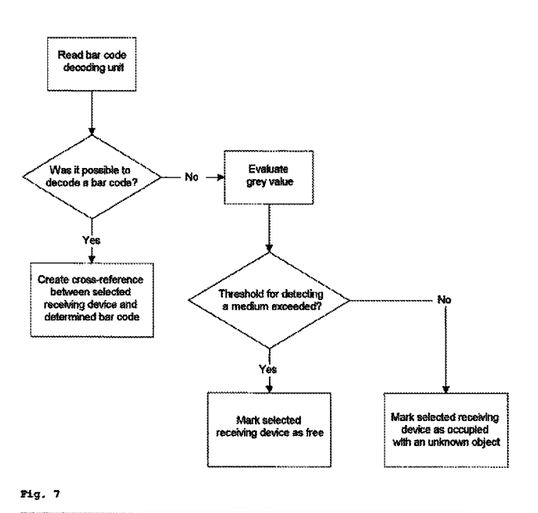
FIG. 7: flow chart for when a bar code reading device having a fixed exposure time is used.

If bar code reading devices 10 having a fixed exposure time are used, the flow chart in FIG. 7 shows how it is possible to proceed if no bar code is decoded so as to establish whether there is an object without a bar code 31 in the storage location 30 or whether the storage location 30 is empty. For this purpose, the detected grey value of the target object would be evaluated, and it would subsequently be decided, by way of a threshold, whether it was possible to identify an object without a bar code in the storage location, or whether said location is empty. As mentioned previously, the detection is of decisive importance for automated devices.

Figure 8:
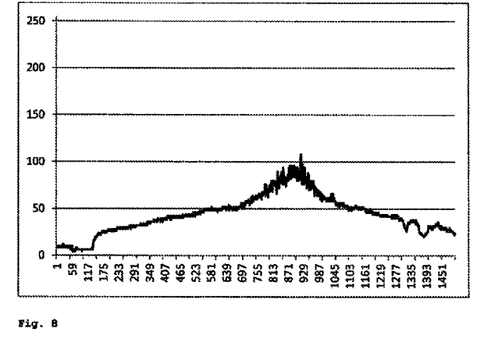
FIG. 8: diagram of the amount of light reflected from a yellow data carrier, the grey value having been recorded via the elements/cells/pixels of a photosensitive medium.

FIG. 8 is a diagram showing the grey value over the respective element/pixel/cell of a photosensitive medium comprising 1500 elements/pixels/cells, by way of the amount of light reflected from a yellow LTO cassette in a storage location.

Figure 9:
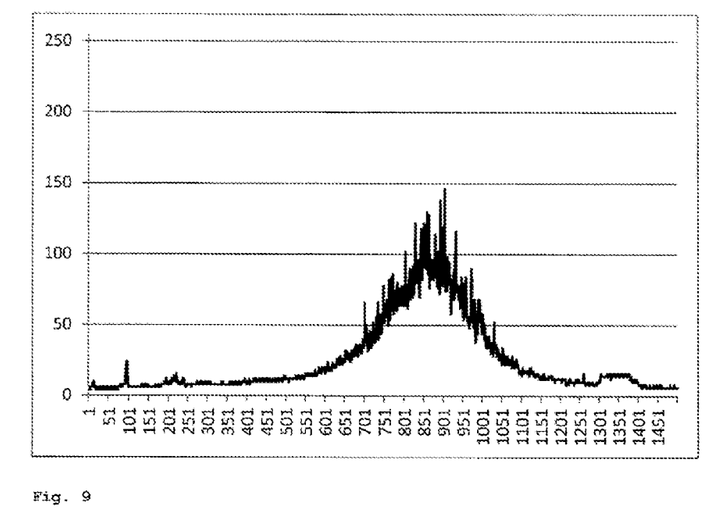
FIG. 9: diagram of the amount of light reflected from a black data carrier, the grey value having been recorded via the elements/cells/pixels of a photosensitive medium.

FIG. 9 is a diagram showing the grey value over the respective element/pixel/cell of a photosensitive medium comprising 1500 elements/pixels/cells, by way of the amount of light reflected from a black LTO cassette in a storage location.

Figure 10:
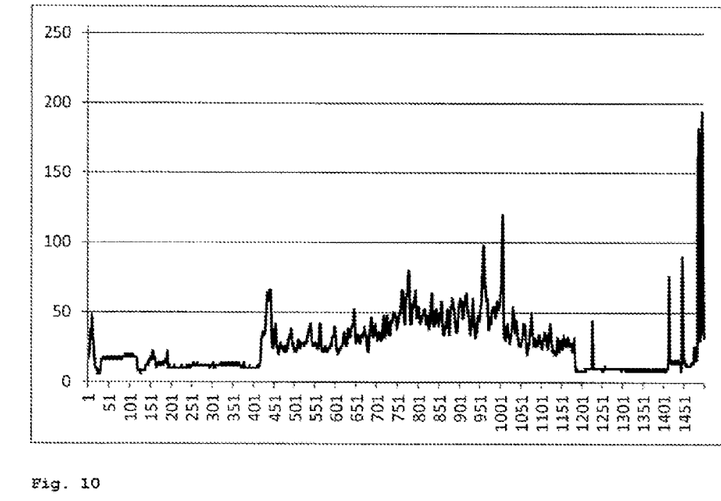
FIG. 10: diagram of the amount of light reflected from an empty storage location which is only open on one side, towards the bar code reader, the grey value having been recorded via the elements/cells/pixels of a photosensitive medium.

FIG. 10 is a diagram showing the grey value over the respective element/pixel/cell of a photosensitive medium comprising 1500 elements/pixels/cells, by way of the amount of light reflected from an empty storage location. In this case, it is conspicuous that the grey value of the elements/cells/pixels which are close to the right edge region of the diagram is very different from the grey value of the elements/cells/pixels further to the left. From this, it can be concluded that in this case the side wall of the adjacent storage location is reflecting light, but this does not impede the detection of an empty storage location since the average is taken over all of the elements/cells/pixels.

Figure 11:
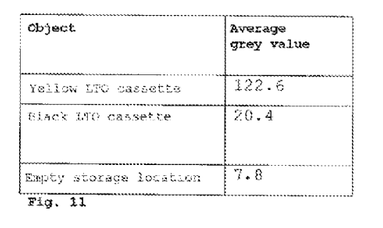
FIG. 11: table showing the average grey values of the various objects of FIG. 8 to FIG. 10 for a fixed exposure time of two milliseconds.

FIG. 11 is a table showing the average grey values of the various objects of FIGS. 8 to 10 for a fixed exposure time of two milliseconds. It is clear that the average grey value, which is determined for example from the arithmetic mean of the individual grey values of the corresponding elements/cells/pixels of a photosensitive medium, for a yellow LTO cassette, which is located in a warehouse 40 as shown in FIG. 3 and constitutes an object 31 without a bar code, is significantly different from a black LTO cassette, which is likewise located in a warehouse 40 as shown in FIG. 3 and also constitutes an object 31 without a bar code, whilst the average grey value of this black LTO cassette is also very different from the average grey value of an empty storage location 30.

Figure 12:
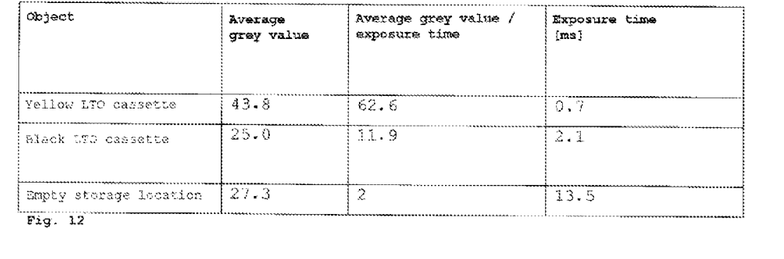
FIG. 12: table showing the average grey values, the average grey values divided by the exposure time, and the exposure time of the various objects of FIGS. 8 to 10 for a bar code reading device having automatic exposure control.

FIG. 12 is a table showing the average grey values, the average grey values divided by the exposure time, and the exposure time of the various objects of FIGS. 8 to 10 for a bar code reading device 10 having automatic exposure control. This makes it clear, on the one hand, that a bar code reading device 10 having automatic exposure control has advantages for the detection and determination of the presence of objects in storage locations by means of a bar code reading device 10, since the exposure time for an empty storage location 30 differs from the storage locations comprising objects without a bar code 31 even more than what can be derived from the grey value itself. Accordingly, the average grey value divided by the exposure time also has these clear differences.

It should be noted that the method and the devices are not merely to be limited to the examples given above. Rather, the basic approach can be applied to systems which make use of bar code reading devices for determining the presence of objects in storage locations.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE NUMERALS

10 Bar code reading device
11 Receiving unit for detecting the bar code
12 Illumination unit
20 Gripper system
21 Gripper tongs
30 Storage location
31 Object without a bar code
32 Object with a bar code
40 Warehouse having rear wall consisting of a number of storage places
41 Open shelf/support system consisting of a number of storage places
50 Non-reflected light lobe

What is claimed is:

1. A method for detecting and determining a presence of at least one object in at least one storage location without a special reflection surface, the method comprising:
providing a bar code reading device which is connected to a control unit configured to manage an allocation of the at least one object to the at least one storage location;
using the bar code reading device in an attempt to detect a bar code in the at least one storage location;
determining, using information from which a grey value is derivable, whether the at least one object is in the at least one storage location upon the bar code reading device being unsuccessful in detecting the bar code; and
providing a result to the control unit,
wherein the at least one storage location includes a structure that is made of black plastic material having a texture, at least on a rear wall of the at least one storage location, which because of a density and a depth of the structure is suitable for converting directed light into scattered light.

2. The method according to claim 1, wherein the bar code reading device operates using an automatic exposure control, and wherein the information from which the grey value is derivable is the exposure time, the method further comprising determining that the at least one storage location is empty based on the exposure time exceeding a predetermined threshold.

3. The method according to claim 2, wherein the bar code reading device passes on the exposure time to a superordinate control unit via an interface, and the superordinate control unit checks the threshold, and wherein the bar code reading device conveys both information about the detected bar code and the exposure time via the interface.

4. The method according to claim 1, wherein the bar code reading device operates using a fixed exposure time, and wherein the information from which the grey value is derivable is the grey value itself, the method further comprising determining that the at least one storage location is empty based on the grey value falling below a predetermined threshold.

5. The method according to claim 4, wherein the bar code reading device passes on the grey value to a superordinate control unit via an interface, and the superordinate control unit checks the threshold, and wherein the bar code reading device conveys both information about the detected bar code and the grey value via the interface.

6. The method according to claim 1, wherein the bar code reading device comprises a plurality of photosensitive elements and the grey value is averaged over the individual photosensitive elements, and wherein the bar code reading device is preferably a linear or multi-dimensional digital image data system.

7. The method according to claim 1, wherein the texture has an average roughness depth $R_Z$ of 0.25 millimeters and a maximum individual roughness depth $R_M$ of 3.05 millimeters.

8. The method according to claim 1, wherein the bar code reading device is mounted on a transport unit which is a robot.

9. The method according to claim 1, wherein the method is carried out in a system for automatic stock-keeping and stock management of objects, the system being at least one of:
an automatic medium exchange device;
a picking machine or a picking system;
a self-service till;
a printing press or a print finishing machine; and
a laboratory automation system.

10. A device for detecting and determining a presence of at least one object in at least one storage location without a special reflection surface, the device comprising:
a bar code reading device connected to a control unit configured to manage an allocation of the at least one object to the at least one storage location; and
a detection system configured to detect a bar code and to determine, using information from which a grey value is derivable, whether the at least one object is in the at least one storage location upon the bar code reading device being unsuccessful in detecting the bar code, so as to subsequently provide a result to the control unit,
wherein the at least one storage location includes a structure made of a black plastic material having a texture, at least on a rear wall of the at least one storage location, which because of a density and a depth of the structure is suitable for converting directed light into scattered light.

11. The device according to claim 10, wherein the bar code reading device is configured to operate using an automatic exposure control, and the information from which the grey value is derivable is the exposure time, the detection system being configured to determine that the at least one storage location is empty based on the exposure time exceeding a predetermined threshold.

12. The device according to claim 11, further comprising a superordinate control unit and an interface, the bar code reading device being configured to pass on the exposure time to the superordinate control unit via the interface, the superordinate control unit being configured to check the threshold, wherein the bar code reading device is configured to convey both information about the detected bar code and the exposure time via the interface.

13. The device according to claim 10, wherein the bar code reading device is configured to operate using a fixed exposure time, and the information from which the grey value is derivable is the grey value itself, the detection system being configured to determine that the at least one storage location is empty based on the grey value falling below a predetermined threshold.

14. The device according to claim 13, further comprising a superordinate control unit and an interface, the bar code reading device being configured to pass on the grey value to the superordinate control unit via the interface, the superordinate control unit being configured to check the threshold, wherein the bar code reading device is configured to convey both information about the detected bar code and the grey value via the interface.

15. The device according to claim 10, wherein the bar code reading device comprises a plurality of photosensitive elements and the grey value is averaged over the individual photosensitive elements, and wherein the bar code reading device is a linear or multi-dimensional digital image data system.

16. The device according to claim 10, wherein the texture has an average roughness depth $R_Z$ of 0.25 millimeters and a maximum individual roughness depth $R_M$ of 3.05 millimeters.

17. The device according to claim 10, wherein the bar code reading device is mounted on a transport unit which is a robot.

18. The device according to claim 10, wherein the device is part of a system for automatic stock-keeping and stock management of objects, and the system for automatic stock-keeping and stock management of objects, the system being at least one of:
- an automatic medium exchange device;
- a picking machine or a picking system;
- a self-service till;
- a printing press or a print finishing machine; and
- a laboratory automation system.

* * * * *